United States Patent
Wachsman et al.

(10) Patent No.: US 9,343,746 B2
(45) Date of Patent: May 17, 2016

(54) ADVANCED MATERIALS AND DESIGN FOR LOW TEMPERATURE SOFCS

(75) Inventors: Eric D. Wachsman, Fulton, MD (US); Heesung Yoon, Silver Spring, MD (US); Kang Taek Lee, Greenbelt, MD (US); Matthew Camaratta, Gainesville, FL (US); Jin Soo Ahn, Seoul (KR)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 900 days.

(21) Appl. No.: 13/124,164

(22) PCT Filed: Oct. 14, 2009

(86) PCT No.: PCT/US2009/060643
§ 371 (c)(1),
(2), (4) Date: Apr. 14, 2011

(87) PCT Pub. No.: WO2010/045329
PCT Pub. Date: Apr. 22, 2010

(65) Prior Publication Data
US 2011/0200910 A1    Aug. 18, 2011

Related U.S. Application Data

(60) Provisional application No. 61/105,294, filed on Oct. 14, 2008.

(51) Int. Cl.
*H01M 8/124* (2016.01)
*H01M 4/86* (2006.01)
*H01M 4/88* (2006.01)
*H01M 8/12* (2016.01)

(52) U.S. Cl.
CPC .......... *H01M 4/8657* (2013.01); *H01M 4/8825* (2013.01); *H01M 8/126* (2013.01);

(Continued)

(58) Field of Classification Search
USPC ........................................................ 429/480
See application file for complete search history.

(56) References Cited

U.S. PATENT DOCUMENTS 5,985,476 A * 11/1999 Wachsman et al. ........... 429/495
6,558,831 B1    5/2003 Doshi et al.
(Continued)

FOREIGN PATENT DOCUMENTS

| EP | 1928049 | 6/2008 |
|---|---|---|
| WO | WO 97-41612 | 11/1997 |
| WO | WO 2005045962 | * 5/2005 |

OTHER PUBLICATIONS

Camaratta, M. et al., High Performance Composite $Bi_2Ru_2O_7$—$Bi_{1.6}Er_{0.4}O_3$ Cathodes for Intermediate-Temperature Solid Oxide Fuel Cells, *Journal of the Electrochemical Society*, 2008, pp. B135-B142, vol. 155, No. 2.

(Continued)

*Primary Examiner* — Jacob Marks
(74) *Attorney, Agent, or Firm* — Saliwanchik, Lloyd & Eisenschenk

(57) ABSTRACT

Embodiments of the invention are directed to SOFC with a multilayer structure comprising a porous ceramic cathode, optionally a cathodic triple phase boundary layer, a bilayer electrolyte comprising a cerium oxide comprising layer and a bismuth oxide comprising layer, an anion functional layer, and a porous ceramic anode with electrical interconnects, wherein the SOFC displays a very high power density at temperatures below 700° C. with hydrogen or hydrocarbon fuels. The low temperature conversion of chemical energy to electrical energy allows the fabrication of the fuel cells using stainless steel or other metal alloys rather than ceramic conductive oxides as the interconnects.

19 Claims, 9 Drawing Sheets

(52) U.S. Cl.
CPC .... *H01M 8/1266* (2013.01); *H01M 2008/1293* (2013.01); *H01M 2300/0074* (2013.01); *H01M 2300/0094* (2013.01); *Y02E 60/521* (2013.01); *Y02E 60/525* (2013.01); *Y02P 70/56* (2015.11)

(56) References Cited

U.S. PATENT DOCUMENTS

| | | | |
|---|---|---|---|
| 2002/0098401 A1 | 7/2002 | Barnett | |
| 2002/0155335 A1 | 10/2002 | Kearl | |
| 2002/0177031 A1* | 11/2002 | Doshi et al. | 429/44 |
| 2004/0101729 A1* | 5/2004 | Kearl | 429/30 |
| 2006/0286433 A1* | 12/2006 | Rakowski et al. | 429/38 |
| 2007/0237998 A1* | 10/2007 | Armstrong et al. | 429/31 |
| 2008/0006525 A1 | 1/2008 | Fanton | |
| 2009/0098436 A1* | 4/2009 | Yamada et al. | 429/33 |

OTHER PUBLICATIONS

Park, J-Y. et al., "Stable and high conductivity ceria/bismuth oxide bilayer electrolytes for lower temperature solid oxide fuel cells," *Ionics*, 2006, pp. 15-20, vol. 12.

Leng, Y.J. et al., "Anode-Supported SOFCs with $Y_2O_3$-Doped $Bi_2O_3$/$Gd_2O_3$-Doped $CeO_2$ Composite Electrolyte Film," *Electrochemical and Solid-State Letters*, 2006, pp. A56-A59, vol. 9, No. 2.

Grenier, J.C., "Innovative Oxygen Electrode Materials for Solid Oxide Cells," *Advances and Innovations In SOFCS 2 From Materials to Systems Workshop Proceedings*, Sep. 11-16, 2011, pp. 117-126, Katarino, Bulgaria.

Shah, L.R. et al., "Detailed study on the role of oxygen vacancies in structural, magnetic and transport behavior of magnetic insultaor: Co—$CeO_2$," *Journal of Physics: Condensed Matter*, 2009, pp. 486004 (9 pages), vol. 21.

* cited by examiner

ADVANCED MATERIALS AND DESIGN FOR LOW TEMPERATURE SOFCS

CROSS-REFERENCE TO RELATED APPLICATIONS

This application is the U.S. national stage application of International Patent Application No. PCT/US2009/060643, filed Oct. 14, 2009, which claims the benefit of U.S. Provisional Application Ser. No. 61/105,294, filed Oct. 14, 2008, the disclosures of which are hereby incorporated by reference in their entireties, including all figures, tables, or drawings.

The subject invention was made with government support under the Department of Energy, Contract No. DE-AC05-76RL01830. The government has certain rights to this invention.

BACKGROUND OF THE INVENTION

A fuel cell is an electrochemical device that converts chemical energy in the oxidation of fuels (such as hydrogen, methane, butane or even gasoline and diesel) into electrical energy. Fuel cells are simple devices that contain no moving parts, consisting essentially of four functional elements: cathodes, electrolytes, anodes and interconnects. Solid oxide fuel cells (SOFCs) are attractive because of their ability to convert a wide variety of fuels to electrical energy with a high efficiency of up to 70% in pressurized systems as compared to engines and modern thermal power plants that typically show a maximum of 40% efficiency. In applications designed to capture the SOFC's waste heat for co-generation, the overall efficiency can top 80 percent. SOFC technology has the distinct advantage over competing fuel cell technologies (e.g. molten carbonate, polymer electrolyte, phosphoric acid and alkali) because of its ability to use fuels other than hydrogen and their relative insensitivity to CO, which act as poisons to other fuel cell types.

The general design is that of two porous electrodes separated by a ceramic electrolyte. The oxygen source, typically air, contacts the cathode to form oxygen ions upon reduction by electrons at the cathode/electrolyte interface. The oxygen ions diffuse through the electrolyte material to the anode where the oxygen ions encounter the fuel at the anode/electrolyte interface forming, water, carbon dioxide (with hydrocarbon fuels), heat, and electrons. The electrons transport from the anode through an external circuit to the cathode.

Although SOFCs are, in concept, simple, the identification of efficient materials for the components remains an enormous challenge. These materials must have the electrical properties required, yet be chemically and structurally stable. State of the art SOFCs operate at temperatures of about 1000° C. to achieve sufficiently high current densities and power. The reactivity of the components with each other and/or the oxygen and/or the fuel and the interdiffusion between components presents a challenge at the high temperatures. The thermal expansion coefficients of the materials must be sufficiently matched to minimize thermal stresses that can lead to cracking and mechanical failure. The air side of the cell must operate in an oxidizing atmosphere and the fuel side must operate in a reducing atmosphere.

One of the most common electrolyte materials for fuel cells is yttria-stabilized zirconia (YSZ). Yttria serves the dual purpose of stabilizing zirconia in the cubic structure at low temperatures and providing oxygen vacancies. As an alternative to YSZ, doped cerium oxide and doped bismuth oxide have shown some promise, however, neither are sufficient to perform as needed. Bismuth oxide-based electrolytes have high oxygen ion conductivities sufficient for low temperature operations (less than 800° C.) but require high $P_{O2}$ levels for sufficient thermodynamic stability. Low $P_{O2}$ at the anode promotes bismuth oxide decomposition, and results in failure of the SOFC. Cerium oxide based electrolytes have the advantage of high ionic conductivity in air and can operate effectively at low temperatures (under 700° C.). However, these electrolytes are susceptible to reduction of $Ce^{+4}$ to $Ce^{+3}$ on the anode, leading to electronic conductivity and a leakage current between the anode and cathode. A temperature below 700° C. significantly broadens the choice of materials for the cathodes, anodes, and interconnects, which allows for the use of much less expensive and more readily available materials than those used currently for SOFCs.

In addition to the need for a superior electrolyte, the anode and cathode need improvements to form excellent SOFCs. Improvements not only involve identifying superior materials, but also identifying improvement of the triple phase boundary between the electrode, electrolyte, and oxygen or fuel. Hence, viable low temperature SOFC requires identification of a system, materials, structure and fabrication techniques that maximizes efficiency at the minimum temperature.

BRIEF SUMMARY OF THE INVENTION

Embodiments of the invention are directed to solid oxide fuel cells (SOFCs) comprising a multilayer structure that comprise a porous metal-ceramic anode with an anodic functional layer (AFL) coupling the anode to a bilayer electrolyte having a cerium oxide comprising layer and a bismuth oxide comprising layer and a porous ceramic cathode. The SOFCs function at temperatures below 700° C. and display a power density of at least 1 $Wcm^2$ at 650° C. In some embodiments of the invention, the SOFC includes metal or metal alloy interconnects to the electrodes, for example, stainless steel interconnects.

The cerium oxide comprising layer of the bilayer electrolyte can be $Ce_xSm_{1-x}O_{2-\delta}$ (SDC), $Ce_xGd_{1-x}O_{2-\delta}$ (GDC), or $Sm_xNd_yCe_{1-x-y}O_{2-\delta}$. The bismuth oxide comprising layer can be $Bi_{2-x}Er_xO_3$ (ESB), $Bi_2.xDy_xO_3$ (DSB), $Bi_{2-x}Y_xO_3$ (YSB), or $Bi_{2-(x+y)}Dy_xW_yO_3$ (DWSB). In some embodiments of the invention, the values of x or x+y can range from less than 0.1 to about 0.5 and y can range from 0.01 to 0.49. In some embodiments of the invention, the bilayer electrolyte can be less than or equal to 100 µm in thickness. In some embodiments of the invention, the bismuth oxide comprising layer of the bilayer electrolyte can be less than or equal to 20 µm in thickness. In some embodiments of the invention, the bismuth oxide comprising layer can be at least 1% of the thickness of the cerium oxide comprising layer. In some embodiments of the invention, the bismuth oxide comprising layer can be at least 10% of the thickness of the cerium oxide comprising layer.

The metal-ceramic anode in its oxidized form, as when fabricated before use, can be a blend of NiO or CuO with a cerium comprising electrolyte. In embodiments of the invention, the cerium comprising electrolyte can be $Ce_xSm_{1-x}O_{2-\delta}$ (SDC), (GDC) or $Sm_xNd_yCe_{1-x-y}O_{2-\delta}$. The AFL coupling the anode to the bilayer electrolyte can be a cerium oxide comprising compound of like composition to the cerium oxide comprising compound in the metal-ceramic anode and/or of the bilayer electrolyte where the AFL's cerium oxide comprising compound is of a smaller particle size than the particles of the cerium oxide comprising compound in the anode. For example, in embodiments of the invention, where the anode comprises a plurality of particles larger than 1 µm in size the AFL comprises a plurality of particles less than 1 µm in size. In some embodiments of the invention, the AFL's cerium oxide comprising compound can include the metal oxide of the metal-ceramic anode.

The porous ceramic cathode can be $Bi_2Ru_2O_7$ (BRO7), BRO7-$(Er_2O_3)_{0.2}(Bi_2O_3)_{0.8}$ (ESB) composite, BRO-$(Dw_2O_3)_{0.2}(Bi_2O_3)_{0.8}$ (DSB) composite, BRO-$(Y_2O_3)_{0.2}$ $(Bi_2O_3)_{0.8}$ (YSB) composite or BRO-$Bi_{2-(x+y)}Dy_xW_yO_3$ (DWSB) composite. Optionally the cathode can be coupled to the bilayer electrolyte by a cathodic functional layer (CFL). The CFL can be a bismuth oxide comprising compound of the same chemical composition as the bismuth oxide comprising layer of the bilayer electrolyte and of a composite cathode.

Other embodiments of the invention are directed to a method for preparing the SOFC where an AFL is formed on the metal-ceramic anode, upon which the cerium oxide comprising layer of the bilayer electrolyte is deposited on the AFL followed by depositing the bismuth oxide comprising layer on the cerium oxide comprising layer to complete the a bilayer electrolyte, and depositing a porous ceramic cathode on the bismuth oxide comprising layer. In one embodiment of the invention, the AFL can be formed by depositing a GDC or Ni-GDC precursor solution on the metal-ceramic anode surface and heat-treating the resulting precursor coated metal-ceramic anode. In some embodiments of the invention, the bismuth oxide comprising layer can be deposited using pulsed laser deposition (PLD). In some embodiment of the invention, cerium oxide comprising layer can be deposited using pulsed laser deposition (PLD).

DETAILED DESCRIPTION OF THE INVENTION

Figure 1:
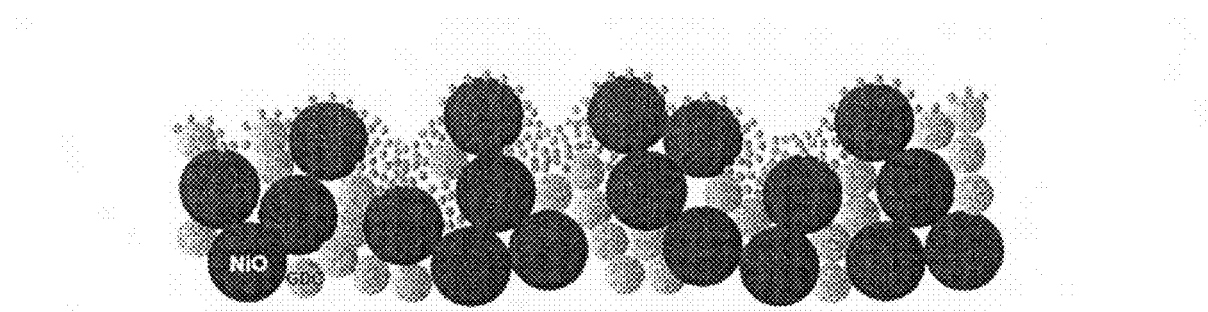
FIG. 1 is a representation of the nature of a GDC AFL coating on a NiO-GDC anode according to an embodiment of the invention.

Embodiments of the invention are directed to a SOFC where the structure of the electrolyte allows for low temperature (<700° C.) generation of electricity by a combination of a superior electrolyte structure that has high ionic conductivity and is stable and electrically resistant at low temperatures with a superior anion functional layer (AFL) acting as a triple phase boundary enhancer that couples the electrolyte to the anode. Embodiments of the invention are directed to SOFC with a multilayer structure comprising a porous ceramic anode, an anode functional layer (AFL) to act as triple phase boundary enhancer that couples the electrode to the electrolyte, a bilayer electrolyte comprising a cerium oxide comprising layer and a bismuth oxide comprising layer, an optional cathode functional layer (CFL), and a porous ceramic cathode with low temperature electrical interconnects, where the SOFC displays a very high power density at temperatures below 700° C., and as little as about 300° C., with hydrogen and/or hydrocarbon fuels. The low temperature conversion of chemical energy to electrical energy allows the fabrication of fuel cells having stainless steel or other relatively low temperature and inexpensive metal alloys, rather than ceramic conductive oxides, such as Cr—Fe($Y_2O_3$), Inconel-$Al_2O_3$ or La(Ca)$CrO_3$, as the interconnects. In addition to lower cost metal interconnects, the employment of lower temperatures allows the cell to be more tolerant of any thermal expansion mismatch, to be more easily sealed, to have less insulation, to consume less energy, have a more rapid startup, and to be more stable.

The bilayer electrolyte comprises a cerium oxide comprising layer and a bismuth oxide comprising layer situated such that the cerium oxide comprising layer is directed toward the anode and sufficiently thick to shield the bismuth oxide comprising layer from the reducing conditions of the anode. The bismuth oxide comprising layer is adjacent to the cathode and is greater than or equal to about 1% of the thickness of the cerium oxide comprising layer, for example 60% of the thickness of the cerium oxide comprising layer for a 10 μm electrolyte for a 500° C. service fuel cell. The actual thickness of the bilayer electrolyte and relative thickness of the layers can vary as necessary for the operating characteristics desired for the specific SOFC application.

The cerium oxide comprising layer can be, for example, $Ce_xSm_{1-x}O_{2-\delta}$ (such as $(Sm_2O_3)_{0.1}(CeO_2)_{0.9}$) (SDC), $Ce_xGd_{1-x}O_{2-\delta}$ (such as $(Gd_2O_3)_{0.1}(CeO_2)_{0.9}$) (GDC), or a co-doped cerium oxide, for example, $Sm_xNd_yCe_{1-x-y}O_{2-\delta}$ (such as $Sm_{0.075}Nd_{0.075}Ce_{0.85}O_{2-\delta}$) and the bismuth oxide comprising layer can be, for example, $Bi_{2-x}Er_xO_3$ (such as $(Er_2O_3)_{0.2}(Bi_2O_3)_{0.8}$) (ESB), $Bi_{2-x}Dy_xO_3$ (such as $(Dy_2O_3)_{0.2}(Bi_2O_3)_{0.8}$) (DSB), $Bi_{2-x}Y_xO_3$ (such as $(Y_2O_3)_{0.2}(Bi_2O_3)_{0.8}$) (YSB) or a co-doped bismuth oxide, for example, $Bi_{2-(x+y)}Dy_xW_yO_3$ (DWSB). The values of x and y can vary considerably, where for mono-doped oxides x or for co-doped oxides x+y is typically 0.1 to 0.35, where the amount of either x or y can be as little as 0.01. The values of x and y need not be limited and x and y can range from 0.01 to 0.5 as needed to provide a desired performance and stability as desired by one skilled in the art. For example, the GDC or SDC material displays excellent $O^{-2}$ ion conductivity at low temperatures, but the $Ce^{+4}$ can be reduced to $Ce^{+3}$ and allows electrical conductivity causing a leakage current. By having the ESB bilayer that does not conduct electricity, this leakage current is prevented. The ESB or other bismuth oxide comprising layer is unstable in a reducing atmosphere and is placed adjacent to the cathode to maintain high $O_2$ conditions throughout the bismuth oxide comprising layer. In the following disclosure other cerium comprising layers can be substituted for the recited GDC layer and other bismuth comprising layer can be substituted for the ESB layer as can be appreciated by one skilled in the art.

The anode in an oxidized form can be, for example, NiO-GDC, which can be fabricated, for example, of micron sized NiO particles and submicron sized GDC. Anodes comprising other metal oxides such as CuO particles rather than NiO particles can be prepared and used in the SOFCs. After preparation of the anode by tape casting and partially sintering, for example at 900° C. for about 2 hours, a GDC or Ni-GDC precursor solution is deposited on the anode surface. The GDC precursor solution can be, for example, Gd$(NO_3)_3$.$6H_2O$ and Ce$(NO_3)_3$.$6H_2O$ and the Ni-GDC precursor solution would also include, for example, Ni$(NO_3)_3$. Nanoparticulate GDC is formed from this precursor solution, which can be applied as an anode functional layer (AFL) to the porous anode to reduce the surface porosity and roughness, yet increases the contact of the NiO with the GDC, as illustrated in FIG. 1. As the anode adjacent electrolyte of the bilayer is GDC, the AFL allows a good contact between the electrolyte and the anode to improve the anodic triple phase boundary. After deposition of the GDC or Ni-GDC precursor, a GDC slurry can be coated on the AFL surface, for example by spraying an ethanol suspension, and the composition sintered, for example at 1450° C. for about 4 hours. The AFL increases the effective number of triple phase boundaries where the solid anode, solid electrolyte and gaseous fuel contact, which accelerates the rate of fuel oxidation and the current density of the fuel cell. Methods employed to form the AFL according to embodiments of the invention that deposit very fine particles of the cerium oxide comprising layer of the electrolyte suspended in a suspension to form the AFL on the anode are superior to state of the art methods for the formation of AFLs, which have been limited to colloidal deposition of fine powders of the same composition as the bulk anode.

For the electrolyte layer other thin layer formation techniques, such as pulsed laser deposition (PLD), can be employed to deposit the GDC on the AFL and anode structure. The preferred deposition method employed will depend on the thickness and density of the layer required for a particular SOFC as can be appreciated by one skilled in the art. Deposition methods that can be used include screen printing, spray coating, PLD on a cool substrate and PLD on a hot substrate, which give the least to highest densities of the deposited layer, respectively.

The second portion of the bilayer electrolyte, for example ESB, can be deposited on the GDC electrolyte by, for example, PLD for a dense layer or, alternately, an ESB layer can be screen printed, spin coated, dip coated, spray coated, or drop coated with a colloidal suspension of ESB particles, followed by sintering on the GDC layer. PLD has advantages with regard to forming a high density ESB layer with high phase purity and good adhesion to the GDC layer results. As indicted above, the ESB layer should be deposited with a sufficient thickness to electrically insulate the cathode from the anode due to the electrical conductance of the GDC layer upon reduction of the $Ce^{+4}$ in the GDC layer.

Figure 2:
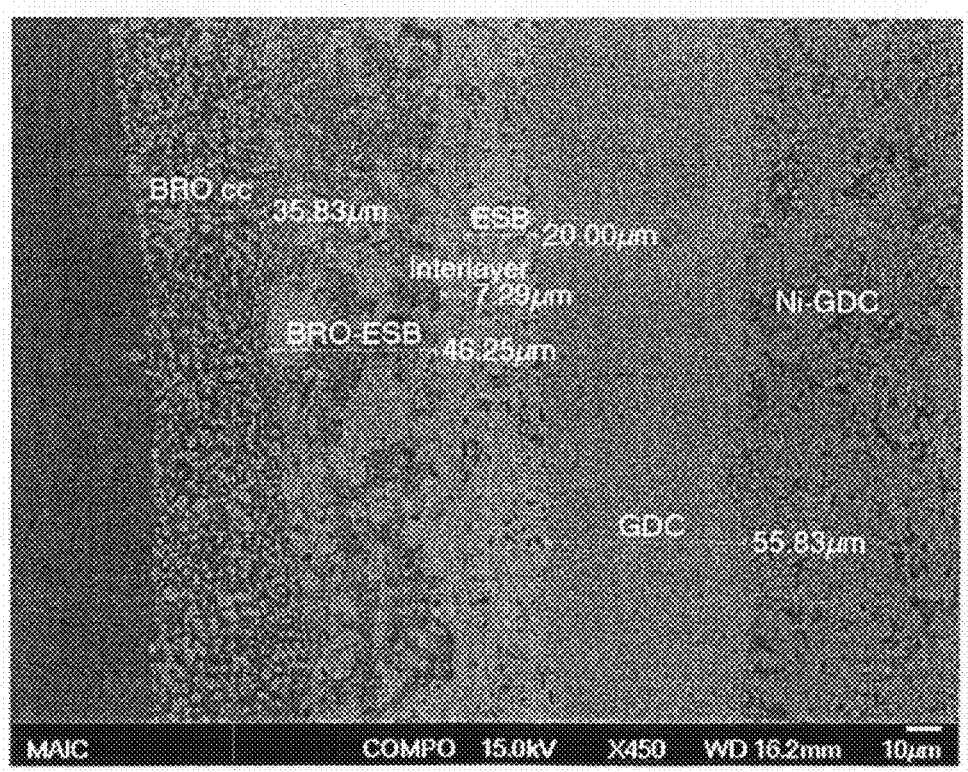
FIG. 2 is a SEM micrograph of the cross-section of a SOFC with a BRO7/BRO7-ESB cathode/(ESB/GDC) bilayer electrolyte/Ni-GDC anode, with a thick (1-2 mm) anode and a thick bilayer electrolyte (55 µm GDC/20 µm ESB) prepared by co-pressing the GDC onto the Ni-GDC anode support and screen-printing the ESB on the GDC after it was sintered.
Figure 3:
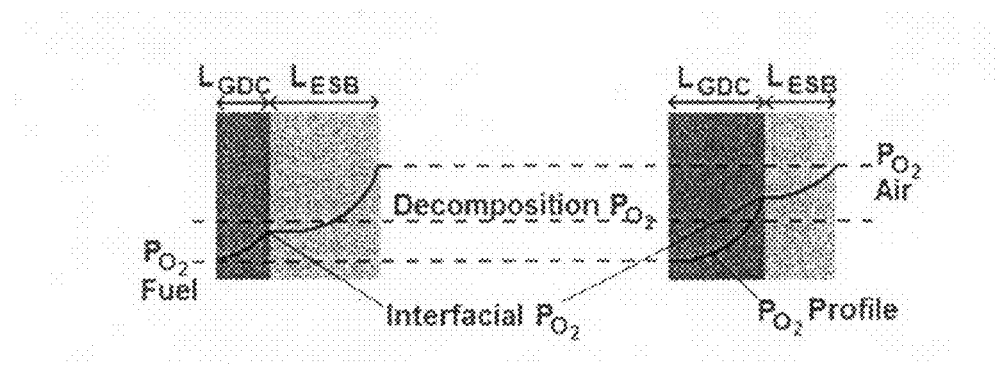
FIG. 3 illustrates the bilayer electrolyte layer approach to a stable electrolyte layer according to embodiments of the invention where the relative thickness of the bilayers avoids an interfacial oxygen partial pressure ($P_{O2}$) level where decomposition occurs.

The cathode is deposited on the ESB layer of the bilayer electrolyte. For example, $Bi_2Ru_2O_7$ (BRO7) powder can be mixed with ESB powder prepared by a solid state route and screen printed on ESB electrolyte as a composite cathode and fired at 800° C. for 2 hours. A cathode such as BRO7 can be deposited on a composite cathode, as shown in FIG. 2 for an SOFC having a cathode, bilayer electrolyte, and anode where the bilayer electrolyte and SOFC are relatively thick as co-pressing and screen printing methods were employed for its preparation.

The SOFC can use, for example, an $Er_{0.8}Bi_{1.2}O_3$/$Gd_{0.1}Ce_{0.9}O_2$ (ESB/GDC) bilayer electrolyte or any other combination that provides higher conductivity and open circuit potential (OCP) than do ceria based electrolytes, such as GDC alone. The function of the ESB, or equivalent, layer of the bilayer electrolyte inhibits electronic conduction through the GDC, or equivalent, layer which when sufficient thick, prevents decomposition of the ESB layer. Although embodiments of the invention are described herein for formation of a bilayer electrolyte of ESB/GDC, one skilled in the art can appreciate that other functionally equivalent oxides can be used in place of ESB and/or GDC. The interfacial $P_{O2}$ can be controlled by varying the thickness ratio of the component layers as illustrated in FIG. 1. By inclusion of the ESB, to form a bilayer electrolyte, a decrease of the total area specific resistance (ASR) results, for example a cathode exhibits about 26% less cathode polarization when on ESB than on GDC, presumably because of bismuth oxide significantly enhancing oxygen dissociation and surface oxygen exchange.

State of the art bilayer electrolytes fail to exhibit high performance for SOFC applications. A significant increase in the OCP of a bilayer electrolyte has been observed only using thick pellets where an ESB layer has sufficient thickness. Embodiments of the present invention allow the formation of a dense ESB layer such that a thin layer can achieve high OCP values. State of the art bismuth oxide-based electrolytes are too reactive towards most conventional cathode systems and can be detrimental to device performance. Embodiments of the present invention are directed to the use of low-resistance ESB-compatible composite cathodes to overcome this reactivity problem.

In embodiments of the invention, pulsed laser deposition (PLD) can be used to deposit a thin, high-quality bismuth oxide comprising layer, for example an ESB layer on a GDC, or other cerium comprising layer, surface where parameters are set for fast deposition rates with the substrate heated during deposition. In this manner a high adhesion coefficient is achieved between the GDC surface and a relatively dense crystalline ESB film results. In other embodiments the ESB film can be deposited by other means such as screen printing, spin coating, dip coating, spray coating, or drop coating with a colloidal suspension of ESB particles.

Figure 4:
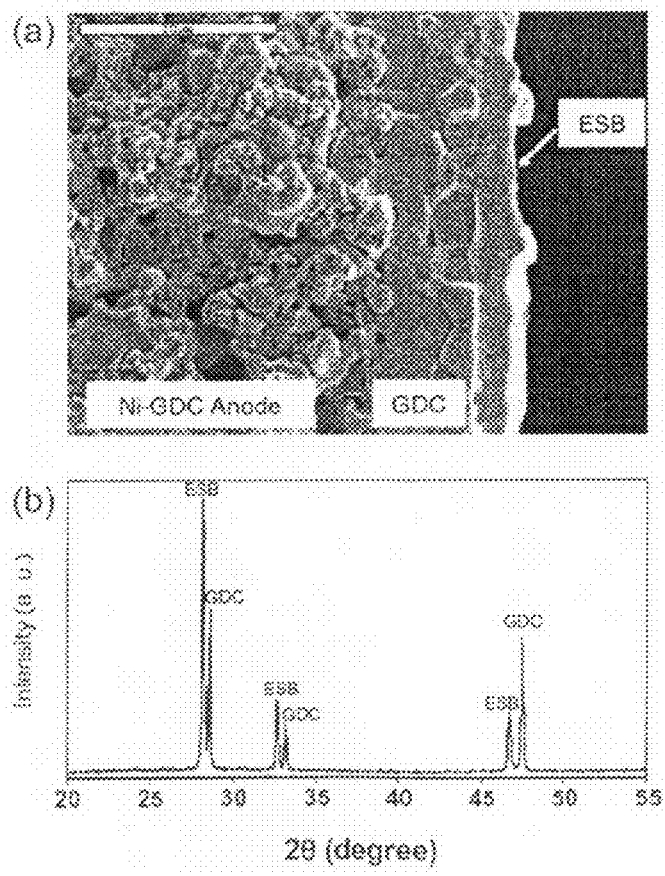
FIG. 4 shows (a) a SEM micrograph of the cross-section of the ESB/GDC bilayer electrolyte on Ni-GDC anode support for a 4 µm thick pulsed laser deposition (PLD) formed ESB layer on a GDC layer and (b) its XRD pattern for the as-deposited bilayer sample according to an embodiment of the invention.

FIG. 4a shows a cross-section of an ESB/GDC bilayer electrolyte on Ni-GDC anode support according to an embodiment of the invention. The cross-section shows an approximately 4 µm thick ESB film on a 10 µm thick GDC layer to yield a 0.4 ESB:GDC thickness ratio. FIG. 4b shows the XRD patterns for the ESB/GDC bilayer sample. Diffraction patterns for ESB and GDC are visible, due to the large X-rays penetration depth. GDC and ESB layers exhibit fluorite structures with slight differences in lattice parameters, such that the reflection lines of the two crystalline structures are grouped in pairs correlating to the same string of Miller indices. FIG. 4b indicates that a cubic fluorite ESB forms on the GDC layer and suggests an epitaxial grain by grain growth of ESB without an additional heat treatment.

Figure 5:
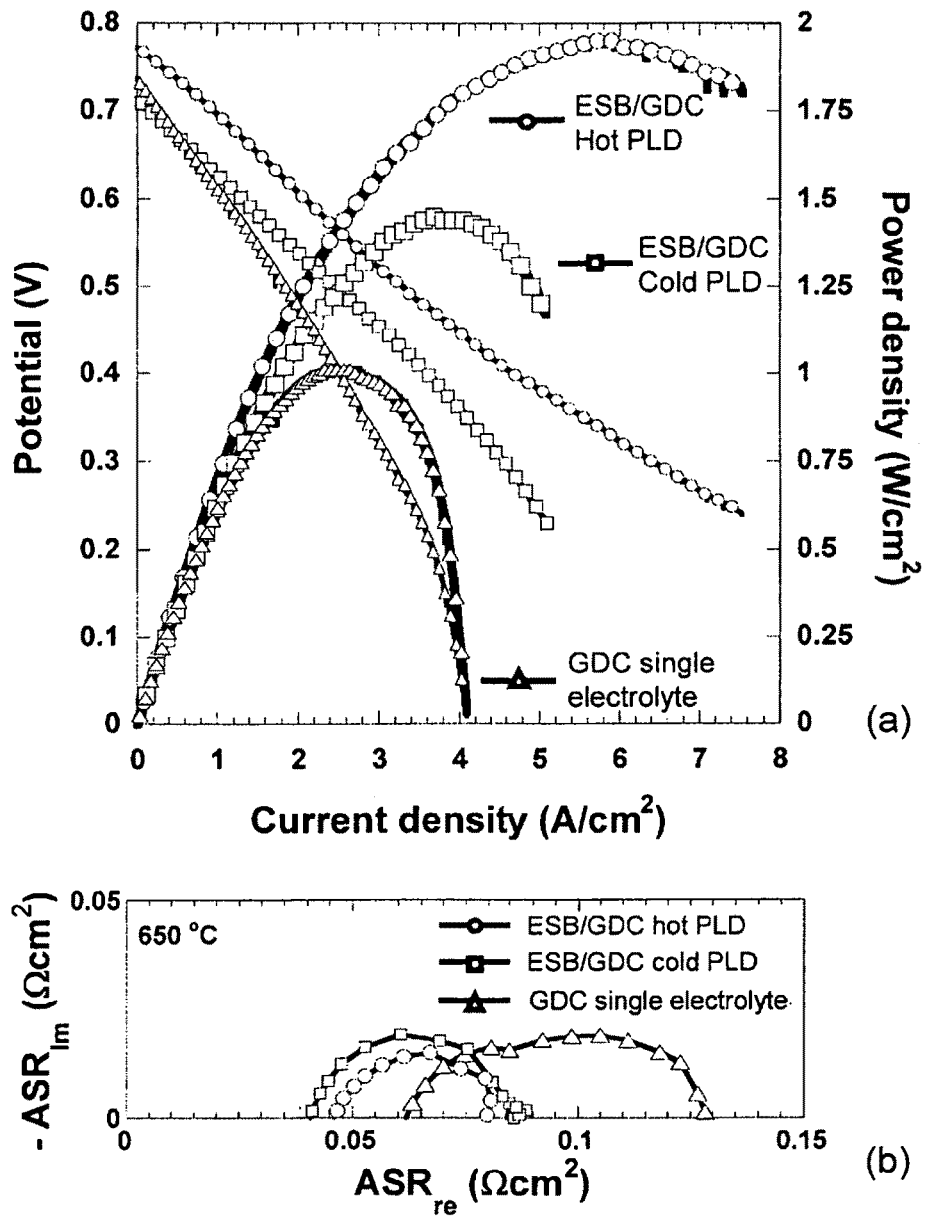
FIG. 5 shows plots (a) of the I-V characteristics of fuel cell samples at 650° C. for a GDC single-layer and ESB/GDC bilayer electrolytes prepared by PLD of ESB on a cold and on a hot GDC substrate according to embodiments of the invention where the data was collected at 90 sccm of air and wet hydrogen and (b) an impedance spectra of the samples having a single and a bilayer electrolyte according to an embodiment of the invention under the same conditions.

FIG. 5a shows the I-V characteristics of SOFCs having monolayer GDC or bilayer ESB/GDC electrolytes. For the GDC monolayer electrolyte SOFCs, the OCP is 0.72 V and exhibits a maximum power density of 1.03 Wcm$^{-2}$ at 650° C. The ASR$_{IV}$ estimated from the initial slope of the I-V curve, is 0.125 Ωcm$^{-2}$, which is a very low ASR for a SOFC composed of a conventional GDC electrolyte with a LSCF-GDC composite cathode.

According to embodiments of the invention, high performance is achieved by a superior SOFC fabrication scheme that employs an improved bilayer ESB/GDC electrolyte and an AFL. FIG. 5a shows a significant improvement in performance achieved using a bilayer cell over a monolayer GDC cell at 650° C. The bilayer ESB/GDC electrolyte formed by deposition of an ESB layer on a heated GDC layer and using a BRO7-ESB cathode display an OCP of 0.77 V and a maximum power density of 1.95 Wcm$^{-2}$, which is 1.93 times that achieved by the state of the art GDC electrolyte with an LSCF-GDC composite cathode. By comparing a monolayer and bilayer electrolyte using BRO7-ESB cathodes, a 1.28 fold increase in the maximum power density was observed using an ESB/GDC bilayer electrolyte. The superior ASR performance observed with a bilayer electrolyte is also clear from an impedance analysis as shown in FIG. 5b by the effect of a bilayer electrolyte on the total ASR measured by two-point probe (cathode and anode) impedance spectroscopy. The ASR values calculated from I-V data, ASR$_{IV}$, and impedance data, as presented in Table 1, ASR$_{Impedance}$ agree within 5%. Table 1 indicates that a bilayer electrolyte reduces the total ASR$_{Impedance}$ of the cell from 0.126 to 0.079 Ωcm$^{-2}$, resulting from a 48% reduction in the electrode ASR and a 26% reduction in the ohmic ASR. The ohmic ASR is lower for the bilayer electrolyte than for the monolayer electrolyte even thought the thickness of the bilayer electrolyte is 1.4 times that of the monolayer electrolyte (4+10 µm vs. 10 µm). This suggests that the thin bilayer electrolyte prepared according to embodiments of the invention may have ESB penetrating into the GDC grain boundaries to decrease the grain boundary resistances.

TABLE 1

ASR values in Ωcm$^{-2}$ for tapecast cells having ESB/GDC bilayer and GDC monolayer electrolytes.

| Cell Type | Total ASR$_{IV}$ | Total ASR$_{Impedance}$ | Electrode ASR | Ohmic ASR |
|---|---|---|---|---|
| GDC Single layer | 0.125 | 0.126 | 0.064 | 0.062 |
| ESB(Cold PLD)/GDC | 0.084 | 0.084 | 0.044 | 0.040 |
| ESB(Hot PLD)/GDC | 0.075 | 0.079 | 0.033 | 0.046 |

Figure 6:
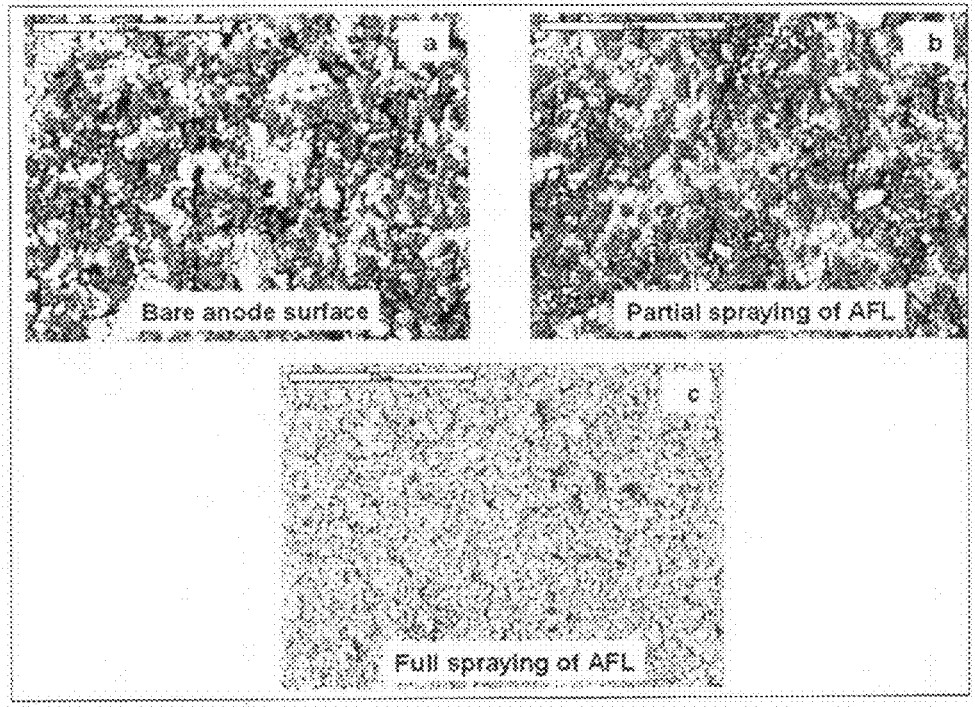
FIG. 6 shows backscattered images taken after presintering the AFL at 900° C. for 1 hour where the porosity and roughness of the (a) rough uncoated anode surface becomes smoother by spray coating a GDC functional layer to (b) a partially GDC AFL coated anode and (c) a fully sprayed GDC AFL coated anode according to an embodiment of the invention.

The AFL, according to embodiments of the invention, comprises the same material, for example GDC, as the electrolyte layer adjacent to it. In general, the AFL is indistinguishable from the adjacent electrolyte layer in cross-sectional SEM images. The formation of the AFL can be viewed during its deposition on the anode's surface. FIG. 6 shows SEM images of the anode surface before any AFL deposition (a), after deposition of a portion of the AFL material (b), and after complete deposition of the AFL (c), where images of the deposited surfaces were taken after heat treatment at 900° C. for 1 hour. The change in anode surface porosity and roughness by formation of the GDC AFL is clearly observable where the porous and rough anode surface (FIG. 6a) displays large voids formed from large NiO particles. Formation of a dense AFL by colloidal deposition is difficult to achieve on such a porous anode surface, especially with materials that are difficult-to-sinter, such. as ceria.

As can be seen in FIG. 6b, a partially sprayed GDC AFL on the anode successfully blocks most large pores on the surface. FIG. 6c shows a completely covering GDC AFL over the entire anode surface and has a relatively smooth and uniform surface for subsequent deposition of a high quality GDC electrolyte layer deposition. NiO particles on the anode surface are completely covered with GDC particles when an AFL is used.

Figure 7:
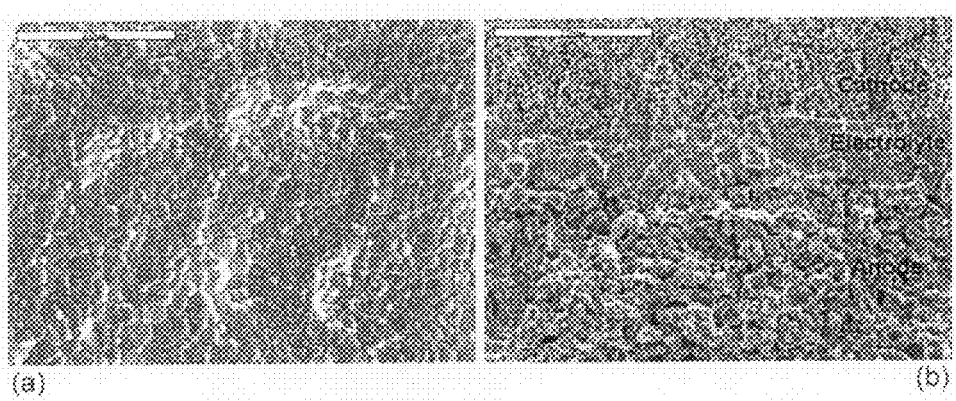
FIG. 7 shows SEM micrographs of SOFCs fabricated with an AFL according to an embodiment of the invention where (a) is the surface view of the GDC electrolyte deposited by spray coating and (b) is the cross-sectional view of the SOFC with an AFL that is not discernable from the electrolyte after I-V testing.

The advantageous effect of the AFL is demonstrated for a SOFC cell, as shown in FIG. 7, where the surface of anode was spray coated with a GDC electrolyte after the anode has a completely deposited AFL. The GDC electrolyte was sintered at 1,450° C. for 4 hours after deposition of the AFL. As seen in FIGS. 7a and 7b, the resultant GDC electrolyte layer is dense. The cross-sectional view of GDC electrolyte (FIG.

7b) for the complete-AFL SOFC shows no open porosity in the 10 μm thick electrolyte layer, yet the high porosity of the anode after reduction of NiO to Ni during operation is apparent in FIG. 7b. The cell was finished by deposition of a LSCF-GDC composite cathode on the GDC monolayer electrolyte.

FIG. 8a shows the I-V characteristics of this monolayer electrolyte SOFCs where no-AFL, a partial-AFL and a full-AFL were deposited on the anode using 30 sccm of wet hydrogen on the anode side and 30 sccm of dry air on the cathode side. At 650° C., the OCP and the maximum power density of the no-AFL sample were 0.677 V and 407 mWcm$^{-2}$, respectively. Despite the very low total ASR calculated from linear fit of this I-V curve (0.237Ωcm$^2$), the maximum power density was not high due to the low OCP value. For comparison, the total ASR from the impedance spectrum of the no-AFL sample in FIG. 8b was 0.218 Ωcm$^2$. ASR values from I-V and impedance measurements agreed within 10% for all samples.

The AFL not only reduces ohmic impedance but also decreases non-ohmic impedance (FIG. 8b). The low OCP value of the sample without an AFL suggests that the 10 μm thick GDC fabricated by spray coating is not sufficiently dense to block H$_2$ gas or electronic leakage currents. However, the OCP value increases from 0.677 to 0.719 V by having even a partial AFL coverage at the interface, and increases dramatically from 0.677 to 0.796 V by a having the complete AFL.

The ASR change for the AFL-free, partial-AFL and complete-AFL samples was analyzed by impedance measurements of the three samples where Table 2 gives the total, ohmic and electrode ASR values. The AFL-free sample displays a total ASR value of 0.218 Ωcm$^2$ at 650° C., where 48% of the total ASR value is from the Ohmic ASR and 52% is from the electrode ASR. Having only a partial-AFL sample reduces the ASR where the measured sample has 59% of the total ASR of AFL-free sample. The reduction in the total ASR is due to a 41% reduction in the Ohmic ASR and a 42% reduction in the electrode ASR. The ASR difference by use of an AFL is consistent with a difference in the anodic polarization. The total ASR was reduced by 60.1% for the sample with a complete AFL relative to that which is AFL-free. The total ASR of the sample having a complete-AFL was 0.089 Ωcm$^2$ at 650° C. resulting in a maximum power density of 994 mWcm$^{-2}$, which is a 144% increase relative to that of the AFL-free SOFC of 407 mWcm$^{-2}$ at 650° C. The ohmic ASR values decreases 51.0% with this AFL, and the electrode ASR reduces 68.4%. Although cathode polarization is commonly viewed as the dominant contributor to polarization in SOFCs, removal of more than 60% of the electrode resistance by use of an AFL shows that the dominant electrode resistance can be due to anode polarization for anode-supported cells.

TABLE 2

ASR Values in Ω cm$^2$ for AFL-free, partial-AFL and complete-AFL SOFCs where total ASR$_{IV}$ is estimated from the slope of the I-V curve near open circuit conditions and the total ASR$_{Impedance}$ is estimated from the impedance spectrum at 650° C.

|  | Total ASR$_{IV}$ | Total ASR$_{Impedance}$ | Ohmic ASR | Electrode ASR |
|---|---|---|---|---|
| AFL-free | 0.237 | 0.218 | 0.104 | 0.114 |
| partial-AFL | 0.130 | 0.128 | 0.062 | 0.066 |
| complete-AFL | 0.089 | 0.087 | 0.051 | 0.036 |

Figure 9:
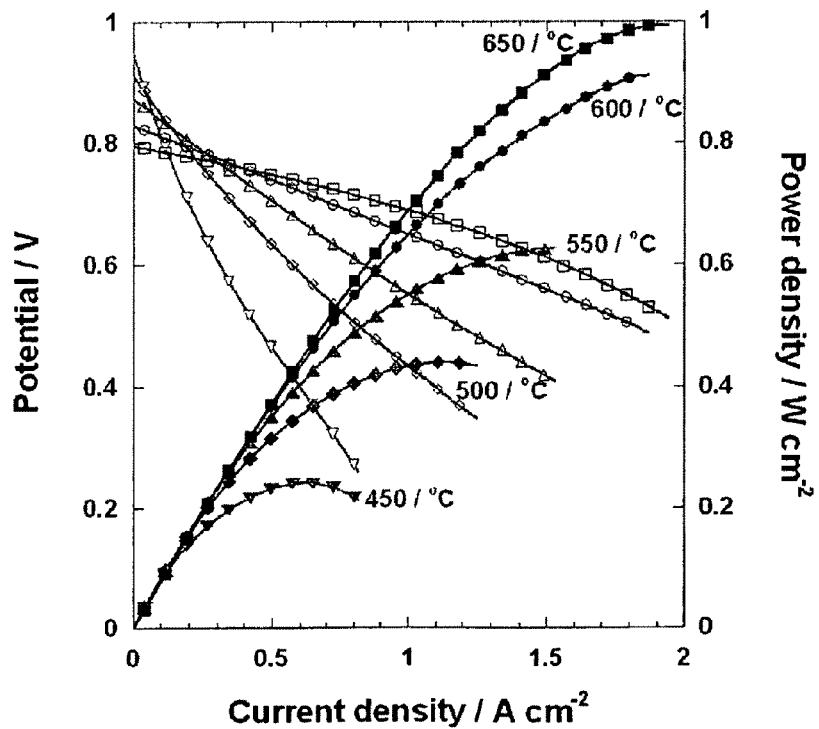
FIG. 9 is a plot of the I-V characteristics of a GDC monolayer electrolyte SOFC having a complete-AFL according to embodiments of the invention at various temperatures ranging from 450 to 650° C. using 30 sccm of wet hydrogen and air.

FIG. 9 shows the I-V behavior of a complete-AFL sample at temperatures ranging from 450 to 650° C. using a monolayer electrolyte. The OCP values are 0.796, 0.830, 0.874, 0.913 and 0.950 V at 650, 600, 550, 500 and 450° C., respectively. The maximum power densities are 994, 913, 627, 440 and 241 mWcm$^{-2}$ at 650, 600, 550, 500 and 450° C., respectively for a sample having a 0.49 cm$^2$ active area where gas flow-rates of 30 sccm. The I-V curve at 650° C. shows an increase in ASR with an increase in current density. The anode shows concentration polarization at high currents even though large NiO particles were used to enhance anode porosity.

Figure 10:
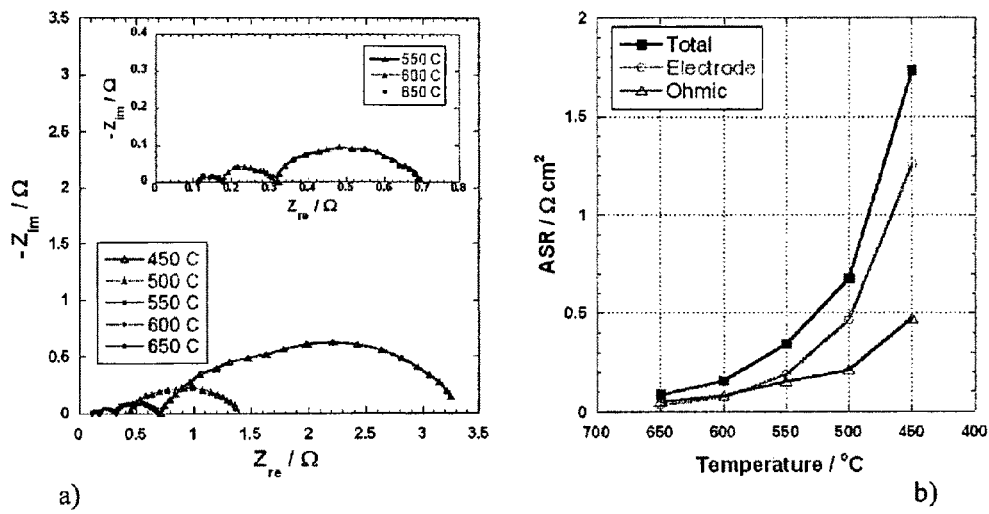
FIG. 10 shows a) impedance spectra of the sample having a complete-AFL according to embodiments of the invention at various temperatures under operating conditions and b) plots the total, electrode and ohmic ASR values calculated from impedance spectra at temperatures ranging from 450 to 650° C. using a GDC monolayer electrolyte.

FIG. 10a shows the impedance spectra at each temperature at which I-V was measured for the GDC monolayer electrolyte SOFC. FIG. 10b shows total, ohmic and electrode ASR values at various temperatures calculated from this impedance data. Ohmic and electrode ASR values were obtained from the low and high frequency intercepts of the spectra with the real axis, respectively. At 650° C., ohmic and electrode polarization losses are both major contributions to the total cell resistance with electrode resistance from the anode and cathode constitutes 41.38% of the total resistance. Electrode resistance increases more than ohmic resistance as the temperature decreases, where at 550° C. the electrode ASR becomes greater than ohmic ASR. At 500° C. electrode resistance becomes 68.79% of the total ASR. However, the total ASR at 500° C. is still lower than 1 Ωcm$^2$, resulting in a maximum power density of 440 mWcm$^{-2}$. At 450° C. electrode resistance constitutes 72.64% of the total resistance of the cell.

Figure 8:
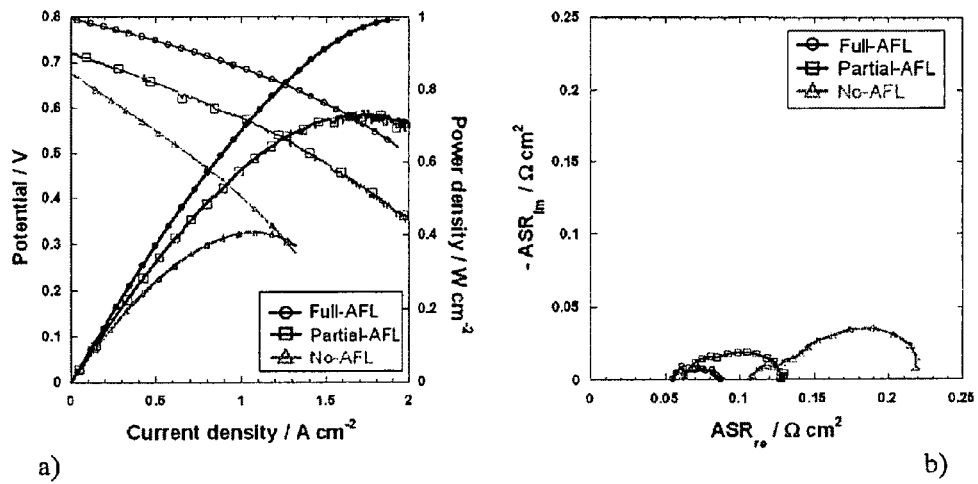
FIG. 8 shows plots that display the effect of the AFL according to embodiments of the invention on the I-V characteristics and impedance spectra where 30 sccm of wet hydrogen and air was used with a) displaying the I-V characteristics for equivalent SOFCs at 650° C. having no-AFL, a partial-AFL and a complete-AFL and b) displays impedance spectra obtained using two-point probe measurements for the no-AFL, partial-AFL and complete-AFL samples at 650° C. under open circuit conditions.
Figure 11:
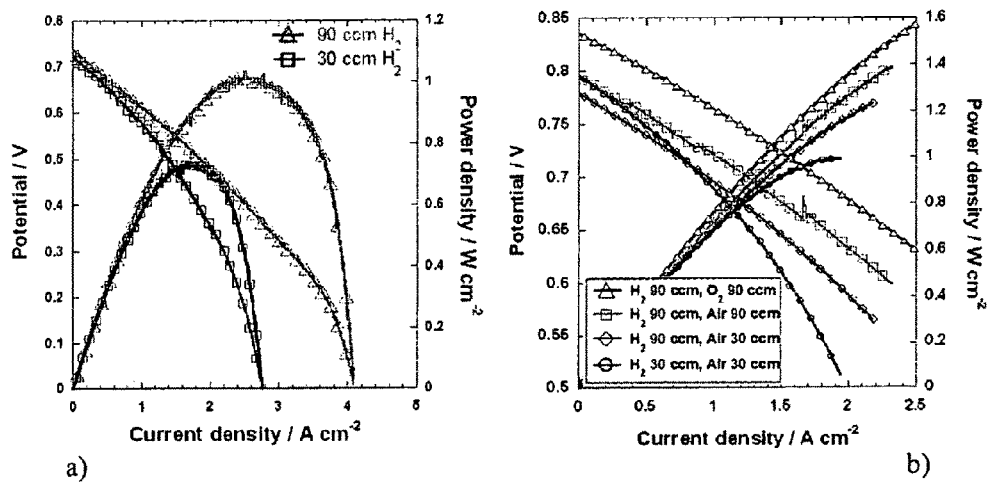
FIG. 11 shows a) the effect of the gas flow-rate on samples having a partial-AFL at 650° C. that produces 1.03 $Wcm^{-2}$ when not limited to 30 sccm of gas flow-rate and b) the effect of gas flow-rate and gas composition on the performance of a complete-AFL sample at 650° C. of a GDC mono-layer electrolyte.

The effect of gas flow rate on the GDC monolayer electrolyte SOFC performance at 650° C. are shown in FIG. 11, where the hydrogen and air gas flow-rates were set at 30 to 90 sccm for the partial-AFL SOFC (9a) and with various hydrogen and oxidant flows for a complete-AFL SOFC. The partial-AFL sample produced a power density of 738 mWcm$^{-2}$ at 650° C. using 30 sccm of wet hydrogen and dry air, as also shown in FIG. 8, where increasing the wet hydrogen and dry air flow rates to 90 sccm results in a power density of 1.01 Wcm$^{-2}$ (FIG. 11a). For the complete-AFL SOFC, an increase of the H$_2$ flow-rate to 90 sccm while maintaining a 30 sccm air flow led to a reduction in ASR at high currents while OCP decreases from 0.796 to 0.779 V (FIG. 11b) which is indicative that the asymmetric flow-rates allows a H$_2$ gas leak through the electrolyte or through a ceramabond sealant used to seal the SOFC. Balancing the H$_2$ and air flow-rates at 90 sccm increased the OCP value back to 0.796 V observed for the balanced flow rates at a lower flow although the slope of the curve did not differ significantly from that of the asymmetric flows with the same H$_2$ flow. By changing the oxidant from air to pure O$_2$ the OCP increases to 0.836 V while ASR was not affected significantly. The maximum power density increased to 1.57 Wcm$^{-2}$ by using 90 sccm of H$_2$ and O$_2$.

Figure 12:
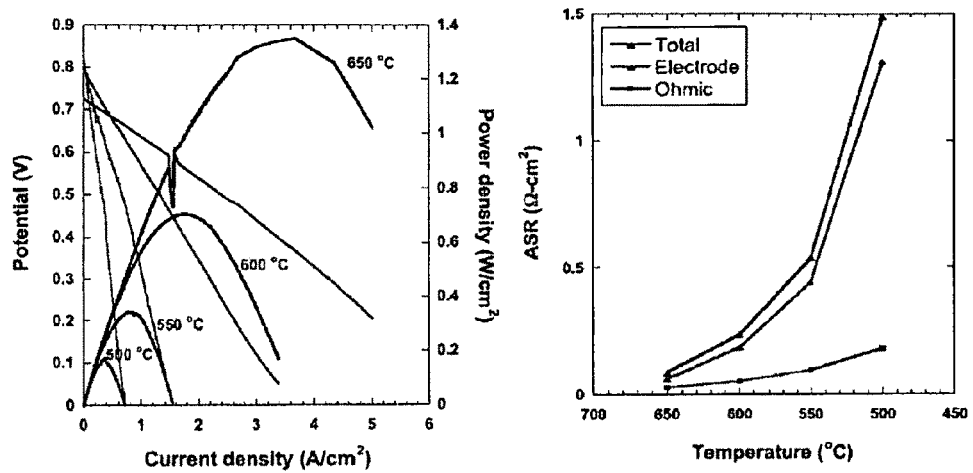
FIG. 12 shows a) plots of the I-V characteristics of a $Sm_x$-$Nd_xCe_{1-2x}O_{1-\delta}$ AFL-free monolayer electrolyte SOFC using 90 sccm of wet hydrogen and air at various temperatures and b)) plots the total, electrode and ohmic ASR values for this monolayer electrolyte calculated from impedance spectra at temperatures ranging from 500 to 650° C.
Figure 13:
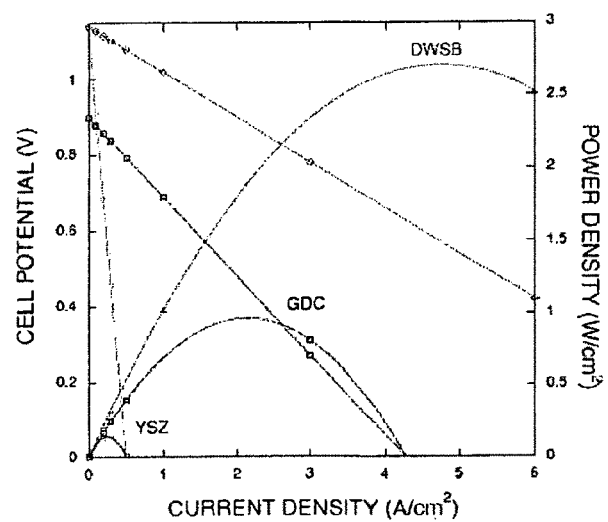
FIG. 13 shows calculated I-V characteristics of a 10 µm DWSB monolayer electrolyte comprising SOFC relative to GDC and YSZ 10 µm monolayer electrolyte SOFCs at 500° C.

In addition to GDC, other cerium comprising electrolytes can be used where even greater power densities can be achieved. For example, FIG. 12a shows I-V characteristics of a Sm$_x$Nd$_x$Ce$_{1-2x}$O$_{2-\delta}$ monolayer electrolyte without an AFL where a power density in excess of 1.3 W/cm$^2$ is achieved at 650° C. with 90 sccm of air and wet H$_2$. As can be seen in FIG. 12b, the ohmic resistance remains low as a fraction of the total ASR value even at 500° C. In addition to ESB, other bismuth oxide electrolytes such as Bi$_{2-(x+y)}$Dy$_x$W$_y$O$_3$ (DWSB) have the potential to achieve high power densities, as is illustrated in FIG. 13 where the performance of SOFCs with 10 μm thick mono-electrolytes of YSZ, GDC and DWSB were calculated to compare the effect of electrolyte resistance under otherwise identical operating conditions and electrode performance.

MATERIALS AND METHODS

General Exemplary Methods

NiO-GDC anode supports were prepared by tape casting a mixture of NiO (Alfa Aesar) and $Ce_{0.9}Gd_{0.1}O_{1.95}$ (GDC) (Rhodia) powder. NiO and GDC powders were mixed (65:35% by wt.) and ball milled using Solsperse as a dispersant in a mixed toluene/ethyl alcohol solvent for 24 hours. A mixture of Di-n butyl phthalate (DBP), polyethylene glycol (PEG) (plasticizer) and polyvinyl butyral (PVB) (binder) was added to the suspension and the suspension ball milled for 24 hours. The slurry was transferred to a vacuum chamber and de-aired with constant stirring. The slurry was tapecast (Procast from DHI, Inc.) and dried for 2 hours at 100° C., and circular green tapes with 32 mm diameter were punched out. The circular anode tapes were partially sintered at 900° C. for 2 hours.

GDC AFLs were prepared from GDC precursor solutions in ethanol. The solution was transferred to a spray gun (Excell), sprayed onto the anode substrate, and sintered at 900° C. for 1 hour.

GDC powder was ball milled for 24 hours using Solsperse in ethanol. PVB and DBP were added and ball-milled was continued for an additional 24 hours. Deposition of a GDC electrolyte layer was carried out by spraying the GDC slurry from the spray gun onto the anode or AFL surface and the ceramic placed in a vacuum oven at 120° C. for 5 hours. The electrolyte coated anode was sintered in air at 3° C. $min^{-1}$ to 1,450° C. and held for 4 hours.

$La_{0.6}Sr_{0.4}Co_{0.2}$—$Fe_{0.8}O_{3-\delta}$ (LSCF) powder (Praxair) and GDC powder, combined to have a 50:50 wt ratio, were ground in a mortar and pestle using alpha-terpinol and ethanol as solvents with DBP and PVB. After mixing and grinding for 1 hour, the suspension was evenly brush-painted onto a GDC monolayer electrolyte and dried in an oven for 1 hour at 120° C. A second layer of the LSCF-GDC suspension was brush-painted onto the first layer. The cathode was fired at 1,100° C. for 1 hour.

ESB was deposited on the spray-coated GDC monolayer using PDL to form an ESB layer of high density. The PLD target was prepared by uniaxial pressing of an ESB powder and sintering at 890° C. for 4 hours. The ESB powder was prepared by solid state synthesis where erbium oxide (Alfa Aesar) and bismuth oxide (Alfa Aesar) powders were combined in appropriate stoichiometric amounts, ball milled for 24 h and calcined at 800° C. for 10 hours to yield $Er_{0.4}Bi_{1.6}O_3$. A KrF excimer (k=248 nm) laser was used with 5 J $cm^{-2}$ energy density and 10 Hz frequency. The distance between target and substrate was 4 cm, $O_2$ filling was 0.05 Torr vacuum, and the substrate (GDC surface on NiO-GDC anode) was heated to 600° C. Total deposition time was 60 minutes. No additional annealing was applied, and the film was examined by X-ray diffraction (XRD).

The composite cathode BRO7-ESB on a bilayer electrolyte, where preparation of the cathode layer and the BRO7 was carried out as disclosed in Camaratta et al., *J. Electrochem. Soc.* 155 (2008) B135, incorporated herein by reference.

Pt paste was brush-painted onto anodes and cathodes as a current collector connected to a Pt mesh and gold lead wires. The current collector painted ceramic was heat-treated at 900° C. for 1 hour.

Fuel cells were loaded on zirconia tubes in a custom-made testing apparatus using two-part ceramabond sealant (a mixture of 517-powder and 517-liquid from Aremco). Dry air and wet hydrogen were supplied to the cathode and anode side, respectively. Open circuit potential (OCP) and the current-voltage (I-V) measurements were carried out with Solartron 1287 at various temperatures. Total cell ASR ($ASR_{IV}$) was estimated from the initial slope of the I-V curves. Following I-V measurements, impedance analysis were carried out at open circuit conditions using two-point probe measurements with a Par-stat 2273 (Princeton Applied Research) using a frequency range from 10 to 0.01 Hz. Impedance spectra were used to calculate the total area specific resistance ($ASR_{Impedance}$). From the high frequency complex plane intercepts of the impedance spectra with the real axis, ohmic ASR values were calculate with resistance normalized according to cathode area. Electrode ASR values were calculated from the difference between low and high frequency intercepts with resistance normalized to the cathode area.

Co-Pressing Procedure

One method used to fabricate bilayer cells involves co-pressing fine GDC powders onto a composite NiO-GDC anode support. The anode support was prepared by uniaxial pressing a well-mixed powder of NiO (Alpha Aesar), a very fine GDC (Rhodia), and a polyvinyl butyral (PVB, Alfa Aesar) binder (3 wt %) in a 1⅛" cylindrical die at ~14 MPa. About 0.35 g de-agglomerated GDC powder was added to the die, being carefully and uniformly spread across the anode substrate surface, and pressed at ~42 MPa. The pellets were subsequently pressed isostatically at 250 MPa, and sintered at 1450° C. for 4 h using a 3° C./min heating rate and a 400° C., 1 h binder burnout step to yield a relatively thick electrolyte (~50 µm).

An ESB layer was screen printed on top of the sintered GDC layer. The ESB powder used in the screen printing ink was prepared by the following solid state technique. Erbium oxide (Alfa Aesar) and bismuth oxide (Alfa Aesar) powders were weighed in stoichiometric amounts, ball milled for 24 h and calcined at 800° C. for 10 h to yield $Er_{0.4}Bi_{1.6}O_3$. An ESB ink were then prepared by mixing ~1 g of the prepared ESB powder (slightly wetted with ethanol) with alpha-terpiniol (Alfa Aesar), di-n butyl phthalate (DBP, Alfa Aesar), and a solution of 10 wt % PVB in ethanol using a 3:1:2 volume ratio in a mortar and pestle until the ink reached a honey-like consistency. The ESB ink was screen printed onto the sintered GDC surface and sintered at 890° C. for 4 h. Cathodes of two different composite materials were prepared: 1:1 by weight $La_{0.6}Sr_{0.4}Co_{0.2}Fe_{0.8}O_{3-\delta}$ (LSCF, Praxair)-GDC and a low ASR BRO7-ESB. Synthesis of BRO7 powder and optimization of BRO7-ESB composite cathodes was carried out as described in Camaratta et al., *J. Electrochem. Soc.*, 155, B135-42 (2008), and incorporated herein by reference. Cathode inks for both materials were prepared in a similar manner to that above for the ESB bilayer electrolyte screen printing ink. Inks were brush painted onto the electrolyte surface, dried at 120° C., and a second layer was applied. LSCF-GDC cathodes were fired at 1100° C. for 1 h, and BRO7-ESB cathodes were fired at 800° C. for 2 h. A Pt current collector (Heraeus) was paint brushed onto both electrodes of LSCF-GDC cathode comprising cells and a pure BRO7 current collector that was prepared using the above ink synthesis method was applied to both electrodes of BRO7-ESB cathode comprising cells. Lead wires and meshes were attached to the electrodes (using Pt paste on the anode side and the same current collector ink used on the cathode side) and fired in-situ with the testing apparatus.

Fuel cell samples were loaded on a zirconia tube in a custom-made testing apparatus using ceramabond sealant (517 from Aremco) with 30 sccm of dry air and 30 sccm of wet hydrogen supplied to the cathode and anode side of the SOFC, respectively. OCP and the current-voltage (I-V) measurements at various temperatures were carried out with a Solartron 1287. The ASR values were calculated from the entire slope of the I-V curves, which were linear over a wide current range.

Figure 14:
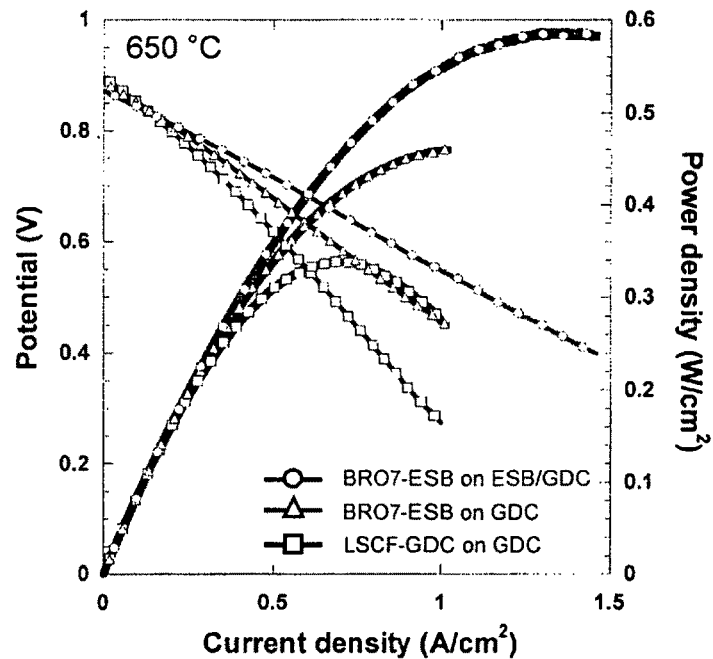
FIG. 14 shows a plot of I-V characteristics of three co-pressed samples at 650° C. using 30 sccm of wet hydrogen and dry air for BRO7-ESB and LSCF-GDC composite cathodes and a ESB/GDC bilayer and a GDC single layer electrolyte.

The results of current-voltage testing at 650° C. are given in Table 3, below, and FIG. 14. As can be seen in FIG. 14 shows BRO7-ESB performs better than LSCF-GDC composite cathode on the same GDC electrolyte and that the ESB/GDC bilayer electrolyte was superior to that of the single layer GDC electrolyte.

TABLE 3

Properties of co-pressed samples.

| Cell Type | OCP (V) | ASR ($\Omega cm^2$) | Maximum Power Density (W/cm$^2$) |
|---|---|---|---|
| LSCF-GDC on GDC | 0.91 | 0.62 | 338 |
| BRO-ESB on GDC | 0.90 | 0.43 | 460 |
| BRO-ESB on ESB/GDC | 0.87 | 0.32 | 588 |

Colloidal Route

For comparison SOFC fabrication was carried out with GDC spray coated on tape-cast anodes followed by ESB colloidal drop coating. The anode support was prepared by tapecasting 65 weight % of NiO (Alfa Aesar) and 35 weight % of GDC (Rhodia) with an appropriate amount of solvents and organic compounds. Anode tapes were presintered at 900° C. for 2 h and GDC electrolytes were deposited by spray coating.

To increase the yield of fine ESB powders, a co-precipitation route was employed. Pure Ce-Nitrate and Er-Nitrate were weighed in the stoichiometric proportions and dissolved in 70% nitric acid. Excess ammonia solution (Acros Organics, 28-30% of $NH_3$ solution in water) was added to the stirred solution until a pH value of 12 is achieved with the formation of yellow brown precipitate. The precipitate was filtered, and dried at 80° C. for 12 h and ground to a fine powder using a mortar and pestle. The powder was calcined at 900° C. for 10 h in air.

A colloidal slurry of ESB powder was ball milled with Solsperse (Air Products and Chemicals), PVB, and DBP in ethanol for 24 h, before drop-coating onto the sintered GDC electrolyte surface. Drop coating was repeated until a desired thickness was achieved. The ESB layer was sintered at 890° C. for 4 h after a 400° C. 1 h binder burnout step, and a 3° C./min ramp-rate. A BRO7-ESB composite cathode, as described above was applied to the ESB surface. A LSCF-GDC composite cathode was applied to a tape-cast cell having a single GDC layer as a baseline. I-V measurements were carried out on the two different samples in the same way with a Solartron 1287. 30 sccm of dry air and 30 sccm of wet hydrogen were supplied to the cathode and anode side, respectively. For the bilayer sample 90 sccm of wet hydrogen was applied to examine the effect of gas flow-rate on I-V maintaining 30 sccm of air. ASR values were calculated from the initial slopes of the I-V curves due to their non-linear nature at most current regions.

Figure 15:
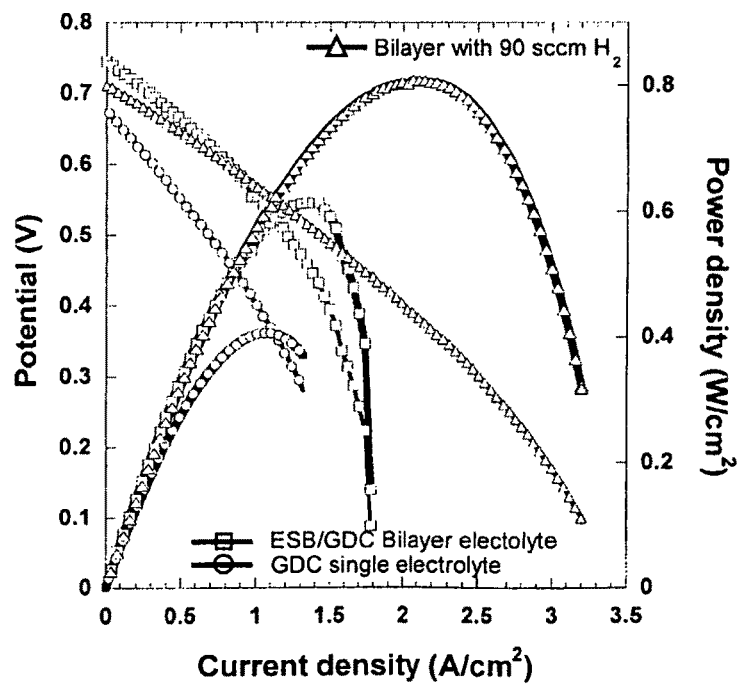
FIG. 15 shows a plot of I-V characteristics of SOFCs with BRO7-ESB composite cathodes and a GDC single layer and a ESB/GDC bilayer electrolyte at 650° C. made by a colloidal method using 30 sccm of air and wet hydrogen, and also for the bilayer electrolyte. using 90 sccm of wet hydrogen and air flow-rate of 30 sccm.

With regard to co-pressing, spray coating of GDC onto tape-cast anode substrates reduced the entire sample thickness from 2-3 mm to ~400 µm and GDC electrolyte thickness was controlled to 10~20 µm. Reduction in thickness was accompanied by a significantly reduction of ASR and an increase in power density as indicated in Table 4, below. At 650° C. the single layer SOFC displayed a power density of 407 mW/cm$^2$ and a low OCP as indicated in FIG. 15. The ESB/GDC bilayer displayed an OCP of 0.75 V which was higher than the single layer electrolyte. The bilayer electrolytes maximum power density of 614 mW/cm$^2$ is as 51% increase over the single layer. The increase is not only due to higher OCP but also due to a lower ASR. even though the GDC electrolyte of the bilayer SOFC (~20 µm) was thicker than that for the single layer GDC SOFC by 10 µm, the I-V curve shows that the bilayer cell exhibits a lower ASR resulting in higher performance. As indicated in FIG. 15, when the $H_2$ flow-rate was increased to 90 sccm (air was maintained at 30 sccm), the maximum power density increased to 808 mW/cm$^2$ with the and the ASR decreasing to 0.133 $\Omega cm^2$. Table 4 shows results of colloidal deposition of ESB by co-precipitation. The bilayer shows a 0.07 V increase in the OCP and a 33% decrease in the ASR for an improvement of 51% in the maximum power density.

TABLE 4

Properties of tapecast cell without AFLs prepared by a colloidal route

| Cell Type | OCP (V) | ASR ($\Omega cm^2$) | Maximum Power Density (W/cm$^2$) |
|---|---|---|---|
| GDC single layer | 0.68 | 0.237 | 407 |
| ESB(colloidal)/GDC | 0.75 | 0.158 | 614 |

PLD

Anode supports were prepared by tape casting, as above. An AFL was deposited between the GDC electrolyte and the Ni-GDC anode. The AFL was prepared by spraying GDC precursor onto a presintered anode and heat-treated at 900° C. for 1 h. For PLD deposition the target was made by uniaxial pressing of ESB powder and sintering at 890° C. for 4 h. ESB powder was prepared by solid state route as above. PLD was carried out using a KrF eximer ($\lambda$=248 nm) laser with a repetition rate of 5 Hz. The distance between target and substrate was 5 cm using a 0.3 Torr $O_2$ atmosphere. The estimated laser fluence at the target was about 3 J/cm$^2$. The substrate (GDC surface on a NiO-GDC anode) was maintained at room temperature. The deposition was made for 45 min. To achieve a pure ESB phase, annealing at 700 and 890° C. for 4 h was employed and the film was imaged by X-ray diffraction (XRD). The crystallinity of the heat-treated ESB layers was compared with the ESB layer without heat treatment.

I-V characteristics were measured as described above with 90 sccm of dry air and 90 sccm of wet hydrogen to the cathode and anode side, respectively. Total cell ASR was estimated from the initial slope of the I-V curves, $ASR_{IV}$. Two-point probe impedance analysis was carried out under open circuit condition using a Par-stat 2273 (Princeton Applied Research) at a frequency range of 10 KHz to 0.01 Hz. Impedance spectra were used to calculate the total ASR ($ASR_{Impedance}$). From the high frequency complex-plane intercepts of the impedance spectra with the real axis, the ohmic ASR values were calculated by normalizing the resistance according to cathode area. Electrode ASR values were calculated from the difference between low and high frequency intercepts, normalizing the resistance according to cathode area.

Improved ESB layer quality was observed when PLD deposition was performed with substrate (GDC electrolyte and AFL on the Ni-GDC anode) heated to 600° C. Target ESB pellet and substrate were the identical to that used for PLD to a cool substrate. The KrF eximer ($\lambda$=248 nm) laser was used with a repetition rate of 10 Hz with a distance between target and substrate of 4 cm and with a 0.1 Torr $O_2$ atmosphere. Estimated laser fluence at the target was about 5 J/cm$^2$. No heat treatment was carried out after the deposition. XRD was employed to check crystallinity of the as-deposited ESB layer. I-V characteristics were carried out by a Solartron 1287 and the impedance analysis was performed by a Par-stat using 90 sccm of air and wet hydrogen. $ASR_{IV}$ and $ASR_{Impedance}$ were used to distinguish the total cell ASR obtained by the two different methods.

Figure 16:
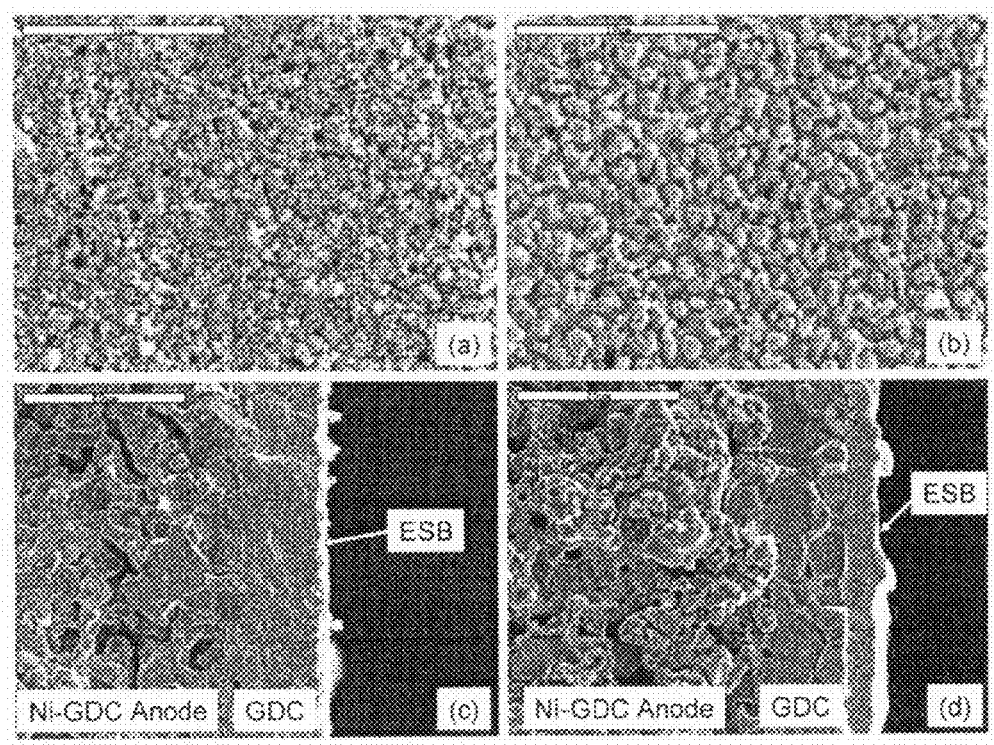
FIG. 16 shows SEM images of PLD formed ESB/GDC bilayer electrolytes according to embodiments of the invention where ESB deposition is on an unheated (a) GDC substrate which is then heated to form a denser layer (b and c) and (d) an ESB layer deposited on a GDC substrate that is heated during PLD.

Although PLD is typically used to deposit ultrathin, high quality, oriented films, for preparation of the bi-layer electrolytes PLD parameters were set for a fast deposition rate so that micron-level thickness can be achieved in an hour of deposition time, and resulted in a porous and lumpy layer. FIG. 16a shows the as-deposited ESB layer on a cool sintered GDC layer was neither dense nor uniform as deposited. The poor quality of the ESB layer was not improved after heat treatment yielding a porous and rough ESB layer as can be seen in FIG. 16b, although the electrolyte surface is fully covered by ESB with no pin holes through which the underlying GDC electrolyte can be observed. However, the layer is not sufficiently dense to block electronic current from the GDC layer as is suggested from a cross-sectional view, FIG. 16c.

FIG. 16d shows that the quality of the ESB film was substantially improved by heating the substrate (GDC electrolyte on the anode) to 630° C. during PLD. The ESB membrane thickness was ~4 µm achieving a 0.4 thickness ratio of ESB to GDC (GDC electrolyte ~10 µm). An additional advantage of carrying out PLD on a hot substrate is that a subsequent heating after ESB deposition is not necessary.

FIG. 5a shows the I-V characteristics at 650° C. of a GDC single layer electrolyte and ESB/GDC bilayer electrolytes where PLD was carried out on a cold and hot GDC substrate. The bilayer electrolyte and BRO7-ESB cathode increased the maximum power density from 1.03 to 1.95 W/cm² (93% increase). The slope of I-V curves shows that the bilayer electrolyte achieved an ASR of 0.075 Ωcm²; a 40% reduction compared with the single layer sample. The increase in OCP from 0.72 to 0.77 V also contributed to the dramatic improvement in power density. The OCP of the hot PLD sample, 0.77 V, is higher than that of cold PLD sample, 0.71 V. This indicates that the increase in OCP is a function of layer densities and thickness and that PLD deposition on a hot substrate resulted in a dense ESB layer.

FIG. 5b shows the effect of a bilayer electrolyte on ASR measured by impedance spectroscopy, and the values are given in Table 1. Again, the total $ASR_{Impedance}$ matches well with the $ASR_{IV}$ within 5%. Table 1 shows the reduction in total $ASR_{Impedance}$ is due to a 48% reduction in the electrode ASR and a 26% reduction in the ohmic ASR. As was the case for the cold PLD sample, the hot PLD sample also produced lower ohmic ASR than the single layer. The thickness of the GDC layer was ~10 µm for both cold substrate and hot substrate. PLD deposited electrolytes. However, the reduction in ohmic ASR is more significant in the sample prepared on the cold substrate compared with that of the hot substrate. This is most likely due to the fact that the ESB layer was much thicker in the hot PLD (FIGS. 16c and 16d) resulting in a proportionally larger electrolyte resistance. Due to the rough nature of the ESB layer produced by cold PLD, the thickness was difficult to characterize, although it appears that PLD on the cold substrate generated a ESB layer that at point are very thin and porous. Although of somewhat higher ohmic ASR, the thicker ESB deposited on the heated GDC substrate displays high power density since it displays a reduced electrode ASR and increased cell OCP.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A solid oxide fuel cell (SOFC) comprising a multilayer structure comprising:
    a porous metal-ceramic anode;
    an anodic functional layer (AFL);
    a bilayer electrolyte comprising a cerium oxide comprising layer and a bismuth oxide comprising layer, wherein the bismuth oxide comprising layer comprises $Bi_{2-x}Dy_xO_3$ or $Bi_{2-(x+y)}Dy_xW_yO_3$ where x is 0.01 to 0.5 or x+y is 0.1 to 0.5 and y is 0.01 to 0.49, and
    a porous ceramic cathode, wherein the SOFC functions at temperatures below 700° C. with a power density of at least 1 W/cm² at 650° C.

2. The SOFC of claim 1, wherein the cerium oxide comprising layer comprises $Ce_xSm_{1-x}O_{2-\delta}$, $Ce_xGd_{1-x}O_{2-\delta}$, or $Sm_xNd_yCe_{1-x-y}O_{2-\delta}$, wherein x is 0.01 to 0.5 or x+y is 0.1 to 0.5 and y is 0.01 to 0.49, and wherein δ is the oxygen vacancy.

3. The SOFC of claim 1, wherein the bismuth oxide comprising layer comprises $Bi_{2-x}Dy_xO_3$ or $Bi_{2-(x+y)}Dy_xW_yO_3$, wherein x is 0.01 to 0.5 or x+y is 0.1 to 0.5 and y is 0.01 to 0.49.

4. The SOFC of claim 1, wherein the bilayer electrolyte is less than or equal to 100 µm in thickness.

5. The SOFC of claim 1, wherein the bismuth oxide comprising layer of the bilayer electrolyte is less than or equal to 20 µm in thickness.

6. The SOFC of claim 1, wherein the porous ceramic cathode comprises $Bi_2Ru_2O_7$, BRO7-$(Er_2O_3)_{0.2}(Bi_2O_3)_{0.8}$ blend, BRO-$(Dy_2O_3)_{0.2}(Bi_2O_3)_{0.8}$ blend, BRO-$(Y_2O_3)_{0.2}(Bi_2O_3)_{0.8}$ blend, or BRO-Bi blend where x+y is 0.1 to 0.5 and y is 0.01 to 0.49.

7. The SOFC of claim 1, wherein the bismuth oxide comprising layer is at least 1% of the thickness of the cerium oxide comprising layer.

8. The SOFC of claim 1, wherein the bismuth oxide comprising layer is at least 10% of the thickness of the cerium oxide comprising layer.

9. The SOFC of claim 1, wherein the metal-ceramic anode comprises a NiO or CuO blend with a cerium comprising electrolyte in its oxidized or reduced form.

10. The SOFC of claim 9, wherein the cerium comprising electrolyte is $Ce_xSm_{1-x}O_{2-\delta}$, $Ce_xGd_{1-x}O_{2-\delta}$ or $Sm_xNd_yCe_{1-x-y}O_{2-\delta}$, wherein x is 0.01 to 0.5 or x+y is 0.1 to 0.5 and y is 0.01 to 0.49, and wherein δ is the oxygen vacancy.

11. The SOFC of claim 1, wherein the AFL comprises a colloidal deposition of fine particles of a cerium oxide comprising compound of the same chemical composition to a cerium oxide comprising compound as the metal-ceramic anode and/or of the bilayer electrolyte wherein the cerium oxide comprising compound of the AFL is of a smaller particle size than the particles of the cerium oxide comprising compound in the anode.

12. The SOFC of claim 11, wherein the colloidal deposition of fine particles of the cerium oxide comprising compound comprises a cerium oxide and metal oxide comprising compound of the same chemical composition as the metal-ceramic anode.

13. The SOFC of claim 1, wherein the anode comprises a plurality of particles larger than 1 µm in size and wherein the AFL comprises a plurality of particles less than 1 µm in size.

14. The SOFC of claim 1, further comprising metal or metal alloy interconnects.

15. The SOFC of claim 11, wherein said metal alloy comprises stainless steel.

16. A method for preparing a SOFC according to claim 1, comprising the steps of:
   providing a porous metal-ceramic anode;
   forming an anode functional layer (AFL) on the metal-ceramic anode;
   depositing a cerium oxide comprising layer on the AFL;
   depositing a bismuth oxide comprising layer on the cerium oxide comprising layer to form a bilayer electrolyte;
   depositing a porous ceramic cathode,
   wherein the bilayer electrolyte comprises $Bi_{2-x}Dy_xO_3$ or $Bi_{2-(x+y)}Dy_xW_yO_3$ where x is 0.01 to 0.5 or x+y is 0.1 to 0.5 and y is 0.01 to 0.49, and
   the SOFC functions at temperatures below 700° C. with a power density of at least 1 W/cm$^2$ at 650° C.

17. The method of claim 16, wherein the forming of an AFL comprises a depositing a GDC or Ni-GDC precursor solution on the metal-ceramic anode surface and heat-treating the precursor coated metal-ceramic anode.

18. The method of claim 16, wherein the depositing of the bismuth oxide comprising layer comprises pulsed laser deposition (PLD).

19. The method of claim 16, wherein the depositing of the cerium oxide comprising layer comprises pulsed laser deposition (PLD).

\* \* \* \* \*